(12) United States Patent
Melberg et al.

(10) Patent No.: US 7,441,726 B2
(45) Date of Patent: Oct. 28, 2008

(54) FLIGHT DECK SECURITY POCKET DOOR SYSTEM

(75) Inventors: David S Melberg, Everett, WA (US); Jonathan T Barrows, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 11/026,889

(22) Filed: Dec. 30, 2004

(65) Prior Publication Data

US 2006/0145007 A1 Jul. 6, 2006

(51) Int. Cl.
*B64C 1/14* (2006.01)

(52) U.S. Cl. .................. 244/129.5; 244/129.4

(58) Field of Classification Search .............. 244/118.5, 244/129.3–129; 49/131–134, 507
See application file for complete search history.

(56) References Cited

U.S. PATENT DOCUMENTS

| | | | | |
|---|---|---|---|---|
| 1,352,100 | A * | 9/1920 | Surprise | 49/425 |
| 3,048,672 | A * | 8/1962 | Cataldo et al. | 200/50.2 |
| 3,058,174 | A * | 10/1962 | Sterling | 49/372 |
| 3,400,490 | A * | 9/1968 | Anderson | 49/372 |
| 3,480,989 | A * | 12/1969 | Edeus | 16/94 R |
| 4,185,799 | A * | 1/1980 | Richards, Jr. | 244/118.5 |
| 4,742,645 | A * | 5/1988 | Johnston | 49/372 |
| 4,750,237 | A | 6/1988 | Johnston | |
| 4,989,808 | A | 2/1991 | Spraggins et al. | |
| 5,044,678 | A * | 9/1991 | Detweiler | 292/144 |
| 5,575,515 | A * | 11/1996 | Iwamoto et al. | 292/341.17 |
| 5,605,016 | A | 2/1997 | Pollard | |
| 6,058,655 | A | 5/2000 | Gravel | |
| 6,131,340 | A * | 10/2000 | Clark et al. | 49/410 |
| 6,186,444 | B1 | 2/2001 | Steel | |
| 6,189,959 | B1 * | 2/2001 | VanAssche et al. | 296/207 |
| 6,601,797 | B2 | 8/2003 | Sheremeta | |
| 6,702,231 | B2 | 3/2004 | Ward | |

* cited by examiner

*Primary Examiner*—Tien Dinh
(74) *Attorney, Agent, or Firm*—Harness, Dickey & Pierce, P.L.C.

(57) ABSTRACT

A security pocket door traverses within a security bulkhead wall that defines a pocket, within which the pocket door traverses, and a through passage to permit people, carts and luggage to pass. The pocket door has an upper door track mechanism and a lower door track mechanism that engages a corresponding upper and lower track mechanism of the bulkhead and floor, respectively. The bulkhead door locks with at least one solenoid with a locking pin that engages a hole in a tab of the pocket door. The locking pin creates a magnetic field with a magnet located in the tab to send a signal to the flight deck in order to indicate a closed and locked or an unlocked pocket door condition. When the pocket door is in its closed position, the door perimeter overlaps the bulkhead on at least three sides of the door and also overlaps with the floor.

26 Claims, 9 Drawing Sheets

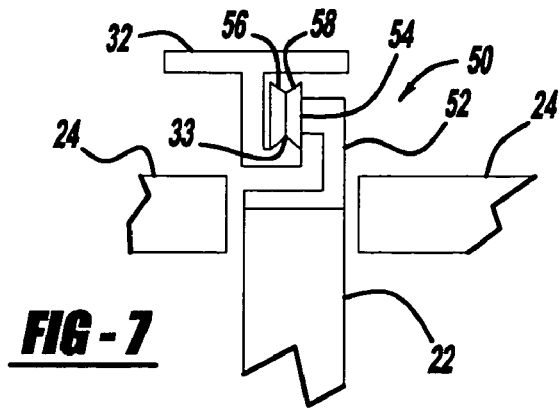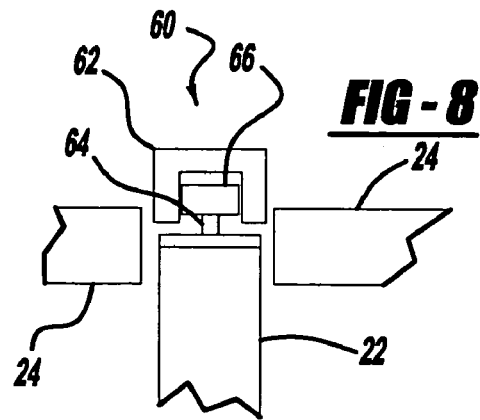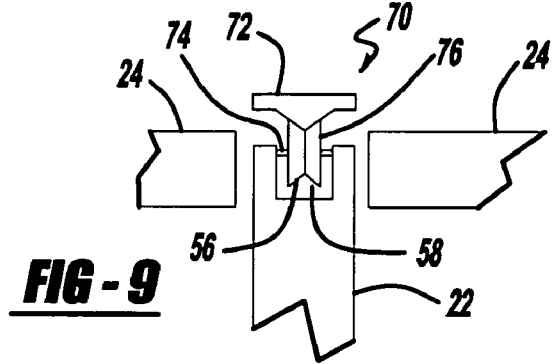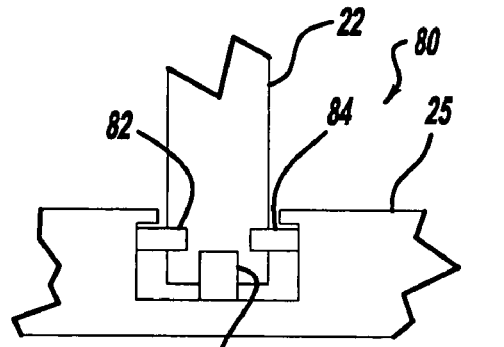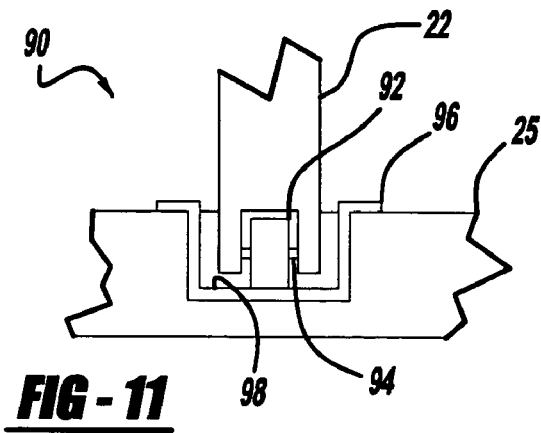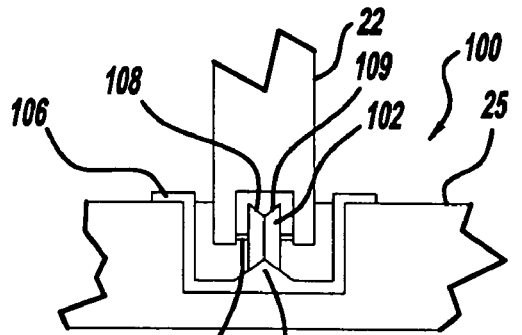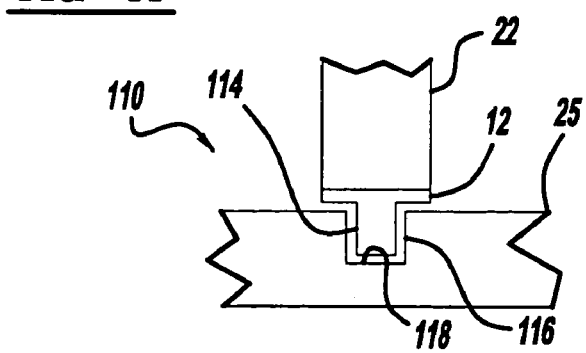

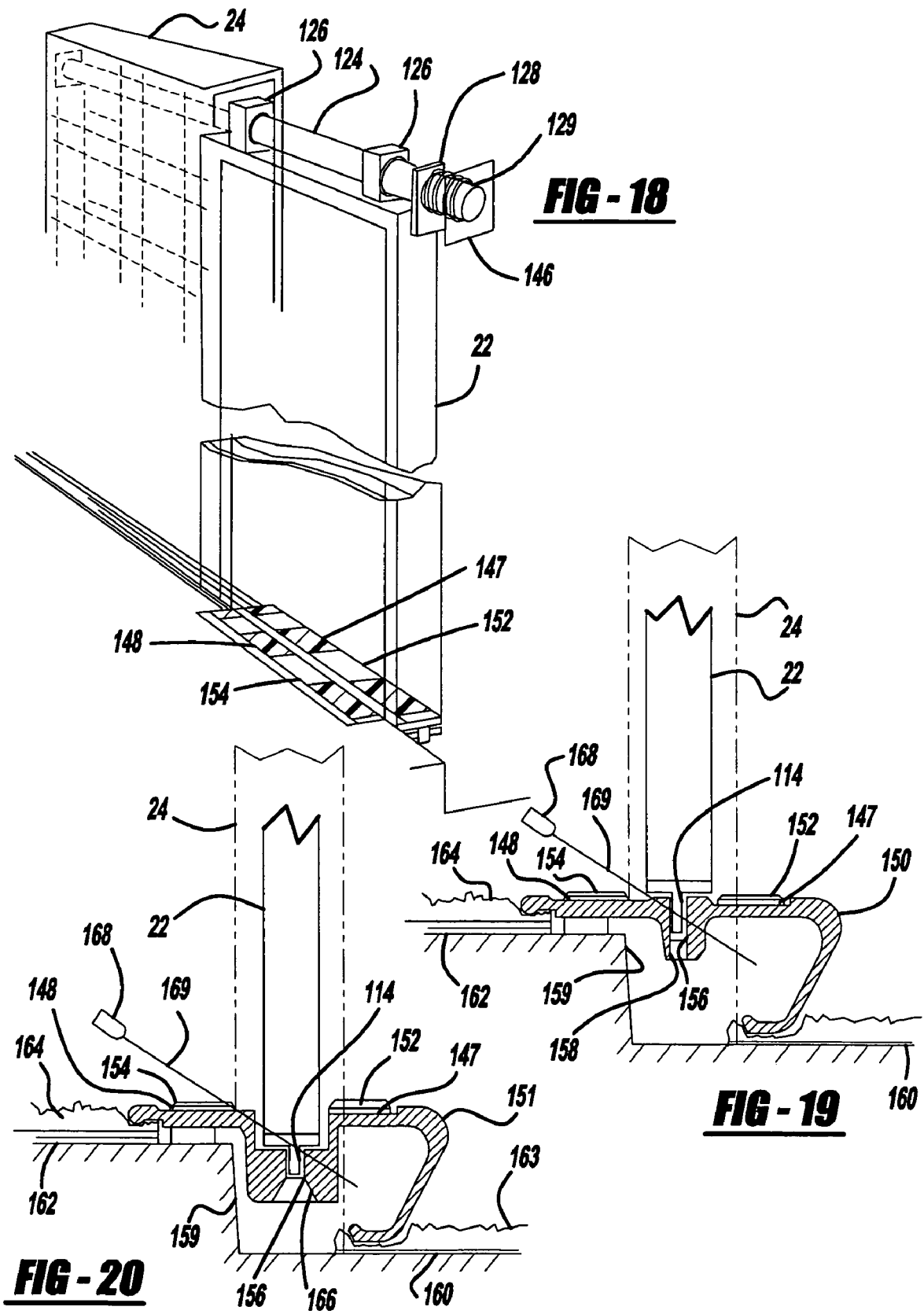

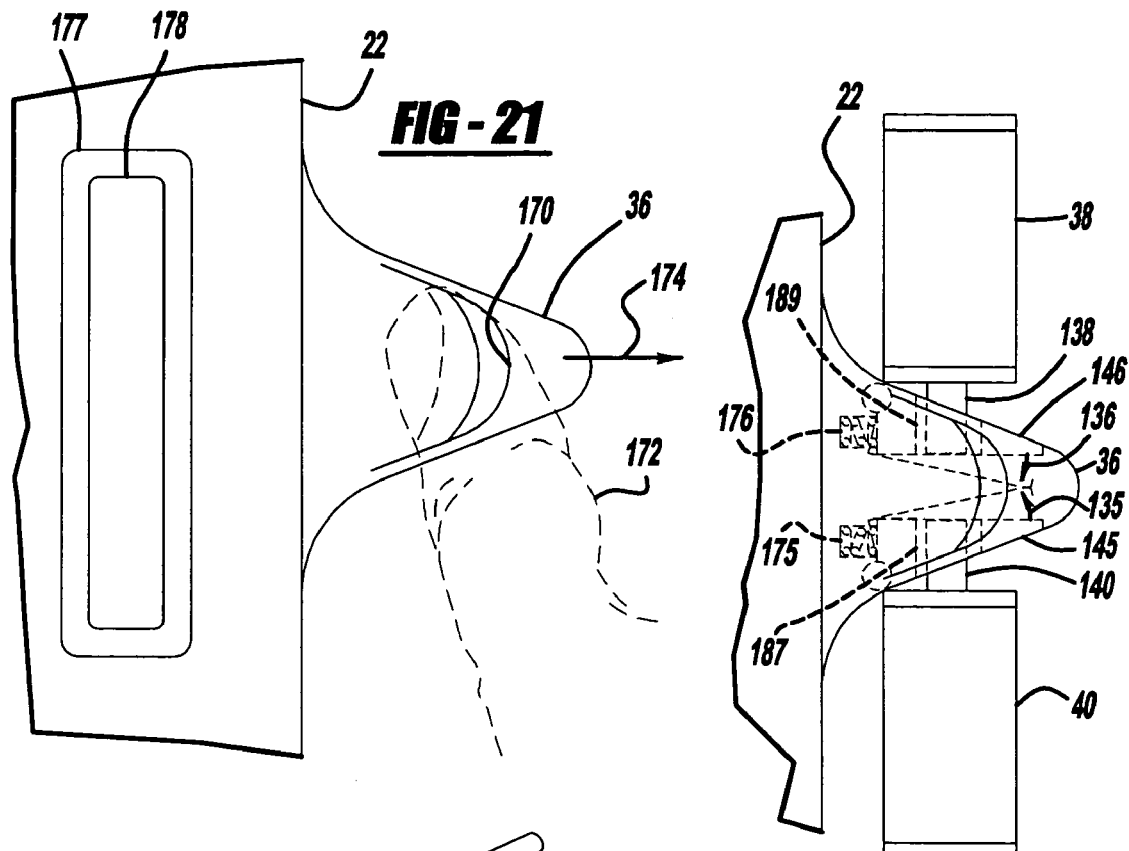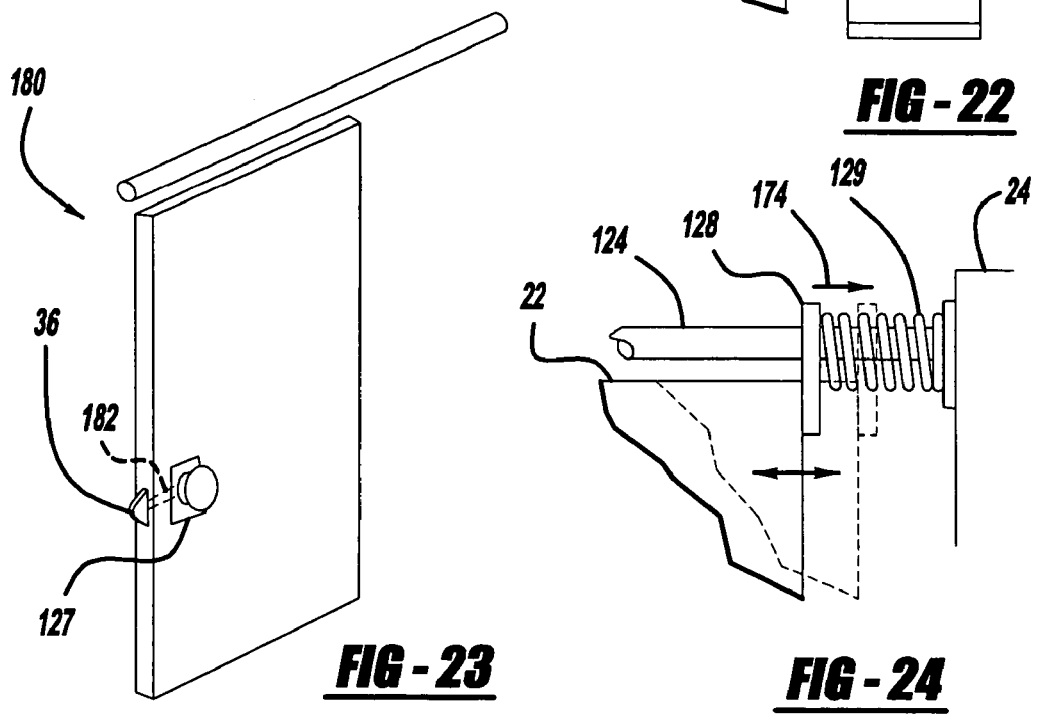

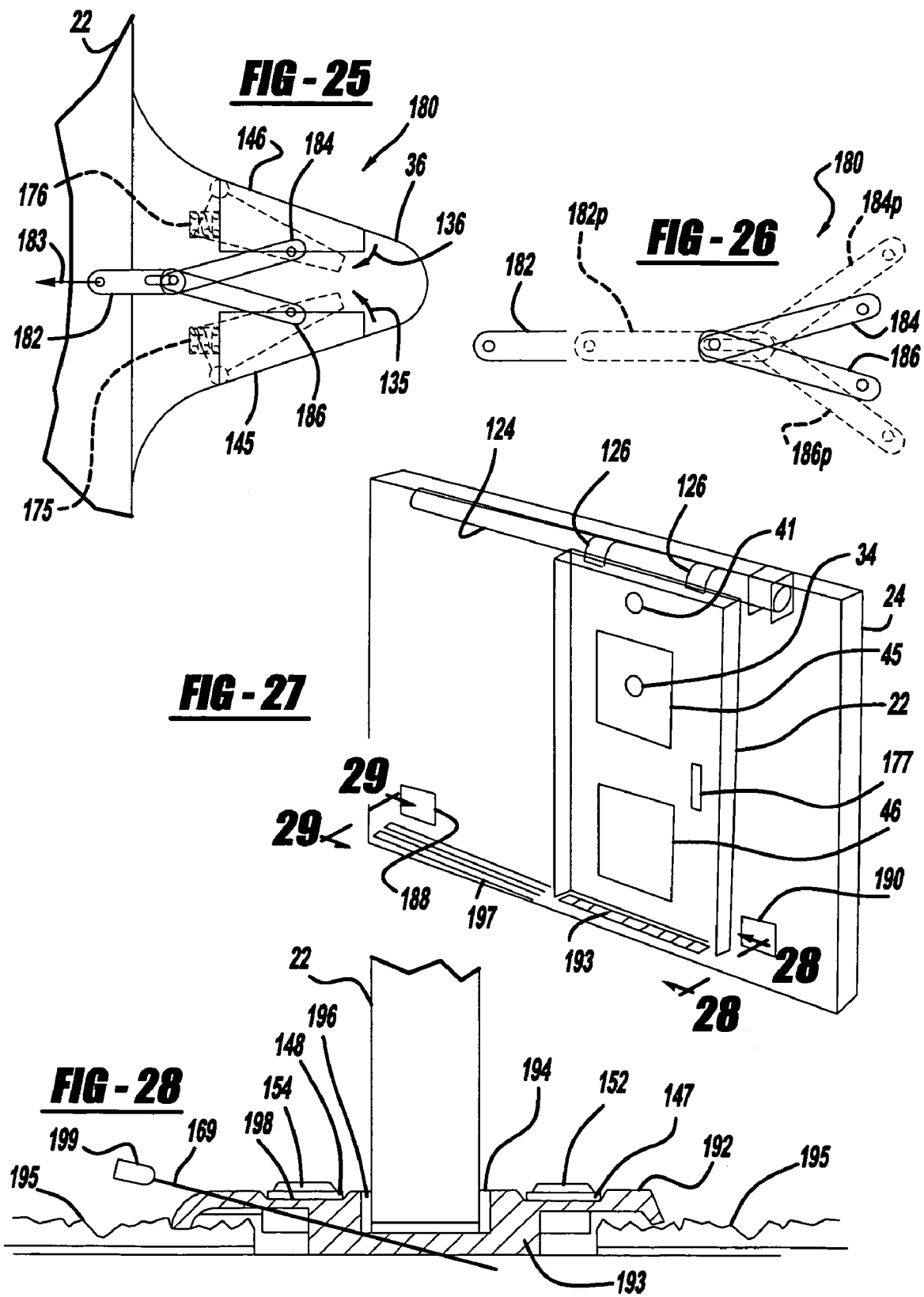

FLIGHT DECK SECURITY POCKET DOOR SYSTEM

FIELD OF THE INVENTION

The present invention relates to pocket door systems, and more specifically, to a flight deck security sliding pocket door system for use within an aircraft.

BACKGROUND OF THE INVENTION

Commercial aircraft manufacturers and their customers are increasingly interested in installing security devices aboard commercial aircraft. More specifically, one area of the security interest is related to cockpit, or flight deck, security and the systems in place to securely separate the flight deck from the passenger compartments of the aircraft. Additionally, Federal Aviation Administration (FAA) regulations have also been increasingly directed to the area of cockpit and flight deck security, and more specifically, to the area of flight deck door security.

While current cockpit doors are generally satisfactory for their applications, each is associated with its share of limitations. One major limitation of current cockpit doors, and interior aircraft doors in general, is their cumbersome characteristics during use. Since many current cockpit and interior doors are hinged so that they can swing in one or two directions, opening such a door can prove cumbersome on an aircraft given the use of floor space with seats, galleys and other necessary structures, and the limited space for people to move out of the path of such an opening door. The problem of opening a swinging, hinged door is compounded when a door user is carrying an item, pulling or pushing a cart, or toting or pulling a piece of luggage. Normally, the user or someone is touched by, or brushes against, a door when it is opened or closed. Alternatively, a user or another normally has to step around or at least move out of the way of an opening or closing door.

Another limitation of current interior and cockpit aircraft doors relates to their non-overlapping structure. That is, when a current hinged, swinging door is closed, a gap, regardless of how small, is realized around the perimeter of the door between the door and its surrounding structure, such as between the door and the bulkhead. This non-overlapping structure allows noise and air to pass around the door.

Yet another limitation of current interior and cockpit aircraft doors relates to their method of locking. Current swinging doors normally latch, or lock, opposite to the hinged side of the door when a user moves a mechanical latching device. These mechanical latch devices take on a variety of styles and methods of use and are susceptible to misalignment and preloading of the mechanisms. Additionally, these mechanical latches have an undesirable level of noise associated with them when they are used.

Still yet another limitation of many current cockpit doors is their less than optimum ballistic and intrusion resistance characteristics. Because of these less than optimum ballistic and intrusion resistance characteristics, some cockpit doors are limited in providing the desired ballistic and intrusion resistance characteristics desired by aircraft customers and the characteristics required by the FAA without heavy metallic inserts and edge treatments in the door and door frame. What is needed then is a device that does not suffer from the above limitations.

SUMMARY OF THE INVENTION

In accordance with the teachings of the present invention, a flight deck security pocket door system is provided that resists intrusion by people and that prevents small arms fire and shrapnel from passing through the door or perimeter edges. Additionally, the flight deck security pocket door system provides a reduction in latch complexity and can provide a weight reduction over current swinging security door systems and will provide improvements in ease of use. The flight deck security pocket door system includes a bulkhead wall with a doorway for the passage of people, wheeled serving carts, luggage, etc. The wall has an upper wall track mechanism on which the bulkhead door, which has an upper door track mechanism and a lower door track mechanism, traverses. The bulkhead door's lower track mechanism engages a floor track mechanism to permit movement on the floor track mechanism.

The system may have at least one solenoid that employs an engagement pin that engages a door latch attached to the bulkhead door to lock the door in its closed position. The upper door track mechanism engages the upper wall track mechanism while the lower door track mechanism engages the floor track mechanism. When the door is in its closed position, the perimeter of the door overlaps the bulkhead on three sides of the door, that is, because the sliding door fits within the wall, the bulkhead wall actually overlaps the door. This overlap provides added strength to prevent intruders and objects from breaching the door, as opposed to a swinging door that fits within a wall opening and merely fills the opening typically with minimum support from door jambs and door stops. Furthermore, when the door is in its closed position, a bottom edge of the door may reside within the floor or threshold, thereby providing overlap of the door below at the level of the floor.

The flight deck security pocket door system may have a second locking solenoid that employs a second locking pin that engages the door latch for redundancy. The door latch may be engaged by the first pin from a top of the door latch and the second pin may engage the door latch from the bottom of the door latch. The door latch may be a pawl-like device that pivots about a pin in the door or it may be a solid non-pivoting attachment. The first pin of the first solenoid and the second pin of the second solenoid may be magnetic to magnetically interact with at least one magnet within the door latch to indicate a closed and locked door condition to the flight deck area or other location. The upper wall track mechanism in the bulkhead wall has a removable section to facilitate installation and removal of the bulkhead door.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention. The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 7 is an edge view of a top rolling mechanism of the security pocket door system;

FIG. 8 is an edge view of a top rolling mechanism of the security pocket door system;

FIG. 9 is an edge view of a top rolling mechanism of the security pocket door system;

FIG. 10 is an edge view of a bottom rolling mechanism of the security pocket door system;

FIG. 11 is an edge view of a bottom rolling mechanism of the security pocket door system;

FIG. 12 is an edge view of a bottom rolling mechanism of the security pocket door system;

FIG. 13 is an edge view of a bottom rolling mechanism of the security pocket door system;

FIG. 18 is a perspective view of the security pocket door system utilizing linear bearings, a spring bumper, a threshold and lights in a doorway having a step-down into a flight deck area;

FIG. 19 is a cross-sectional view of the bottom of the security pocket door of FIG. 18 depicting a clean-out slot in a threshold and how the security door is positioned relative to the step and depicting structure that safeguards against a projectile;

FIG. 20 is a cross-sectional view of the bottom of the security pocket door of FIG. 18 recessed below the top of the threshold and depicting a clean-out slot in a threshold and how the security door is positioned relative to the step depicting structure that safeguards against a projectile;

FIG. 21 is a side view of a finger tab and grab handle of the security pocket door;

FIG. 22 is a side view of a solenoid arrangement depicting the finger tab engaging the solenoid locking pins in a dual solenoid arrangement;

FIG. 23 is a perspective view of a pocket door showing a retraction tab and a mechanical linkage of the security pocket door system;

FIG. 24 is a side view of a wall-mounted spring bumper depicting how a pocket door rebounds from the bumper upon closing the pocket door past the alignment point with the solenoid pins;

FIG. 25 is a side view of a door latching mechanism within a pocket door tab that depicts how the latch will retract when activated with a knob or slide;

FIG. 26 is a side view depicting the motion of the linkage mechanism of FIG. 25;

FIG. 27 is a perspective view depicting the security pocket door and cleanout panels in the surrounding bulkhead;

FIG. 28 is a cross-sectional view of the bottom of the security pocket door and threshold and depicting structure that safeguards against a projectile;

DETAILED DESCRIPTION OF THE PREFERRED EMBODIMENTS

The following description of the preferred embodiments is merely exemplary in nature and is in no way intended to limit the invention, its application, or uses. The teachings of the embodiments of the present invention can be applied in a multitude of situations where a security pocket door is required. For simplicity, the teachings of the present invention are depicted and described in reference to an aircraft application.

Figure 1:
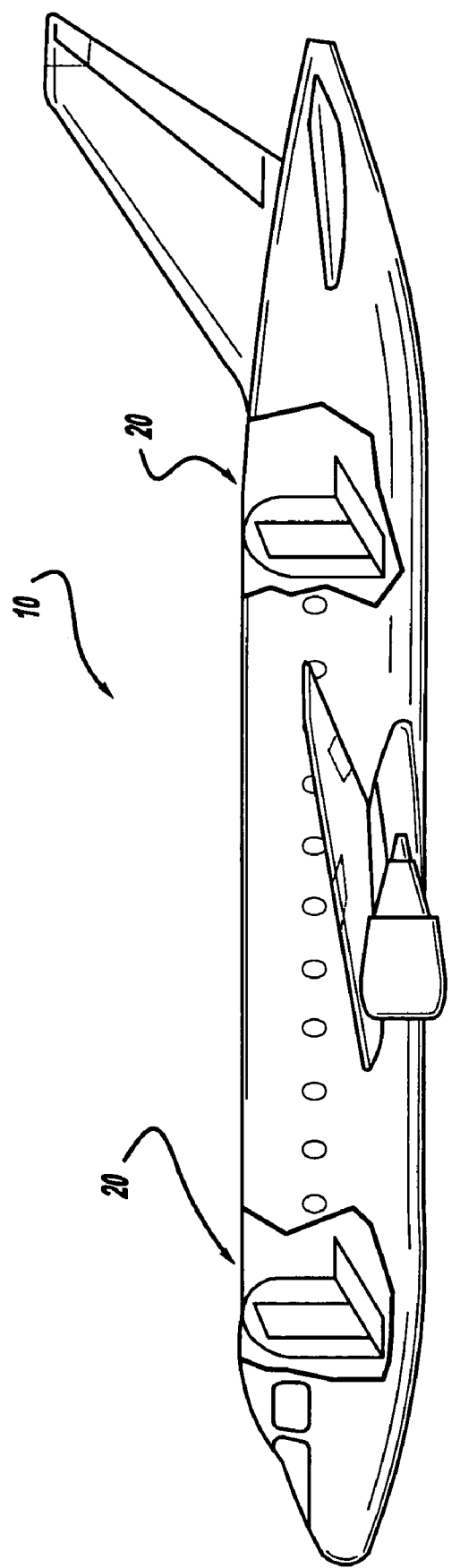
FIG. 1 is a perspective view of an aircraft fuselage depicting locations of security sliding pocket door systems, according to teachings of the present invention.

Turning now to the preferred embodiments of the teachings of the present invention, FIG. 1 depicts an aircraft 10 noting the locations of security pocket door systems 20. It will be noted that while the following description references an aircraft, that the security pocket door can be used on various older types of mobile platforms such as busses, trains, marine vessels, or wherever there is a need to secure a designated area from individuals not authorized to enter the designated area.

In the present example, the security pocket door 20 can be employed in the front of the aircraft, to separate the flight deck from the passenger cabin, or anywhere in the passenger cabin to separate groups of passengers. In FIG. 1, the security pocket door system 20 is depicted in the front of the aircraft and the rear of the aircraft. However, for purposes of this detailed description of embodiments of the present invention, the security pocket door will be discussed with respect to its location in the front of the aircraft 10 where the security pocket door system 20 separates the flight deck, or cockpit, from the balance of the aircraft fuselage normally occupied by passengers.

Figure 2:
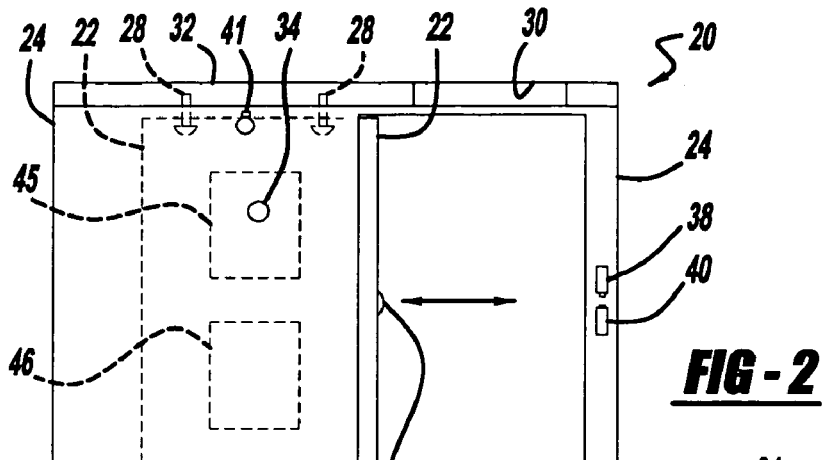
FIG. 2 is an elevation view of the security pocket door system, according to teachings of the present invention.

Turning now to the details of the teachings of the first embodiment, FIGS. 2-6 depict a removable security pocket door system 20. FIG. 2 depicts a security pocket door 22 residing within a bulkhead 24 of the aircraft 10. The security pocket door 22 traverses within the bulkhead 24 by riding on a top track hanger 32. The security pocket door 22 has at least two door hangers 28 that interface with the top track hanger 32 by sliding or rolling on the top track hanger 32. In this first embodiment of the security pocket door system 20, a removable top track section 30 fits within the top track hanger 32, the removable top track section 30 being removable from the top track hanger 32 to facilitate installation and removal of the security door 22.

In FIG. 2, the security door 22 is depicted with a hidden or dashed line. When the security door 22 is moved to its closed position, from its open position, a finger tab 36 becomes situated between a top solenoid 38 and a bottom solenoid 40. When the solenoids 38, 40 are electrically de-energized, they permit the pocket door 22 to open, that is, the solenoid pins retract. When the solenoids 38, 40 are energized, the pocket door becomes locked. The locking of the security door 22 is accomplished when the finger tab 36 is engaged by solenoid pins, to be discussed later. The security door 22 also has a bottom track 42 within which the bottom portion of the security door 22 may traverse. The security door 22 is provided with an armored, wide angle peep hole 34, and in some instances multiple peep holes, so personnel from the flight deck side of the security door 22 can look through the peep hole(s) 34 toward the passenger cabin side of the security door 22. The security door 22 can be provided with at least one decompression panel 45 that when released due to a pressure differential between each side of the door, serves as a path for air to flow between the passenger cabin and the flight deck should the airplane experience an explosive decompression due to a breach in the pressurized section of the fuselage. The security door 22 also may be provided with an escape panel 46 that when released, will allow the flight deck occupants entry into the passenger cabin should the security door 22 become jammed in an emergency. Finally, the security door 22 is provided with a deadbolt that is operated with a key from the passenger cabin side or a lever from the flight deck side which, when activated, will make the key inoperable. The deadbolt will engage the top track section 32 when the bolt is extended.

Figure 3:
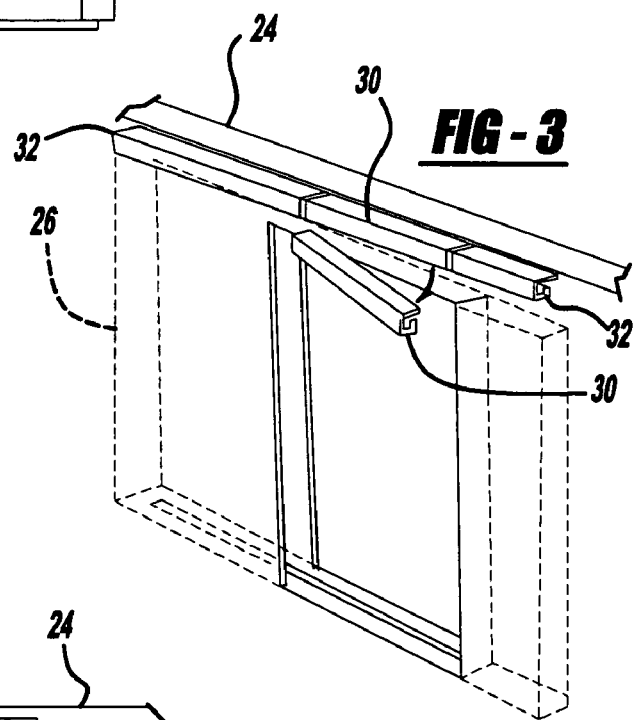
FIG. 3 is a perspective view of the security pocket door system showing an example of its removable track system, according to teachings of the present invention.

FIG. 3 depicts the removable top track section 30 in its removed state from the top track hanger 32, which is situated directly below a portion of the bulkhead 24. A pocket 26 is the space within which the security door 22 traverses on a bottom track 42. In this embodiment, the top track hanger 32 has just one removable top track section 30, although it is conceivable that the top track hanger 32 may have more than one removable top track section 30.

Figure 4:
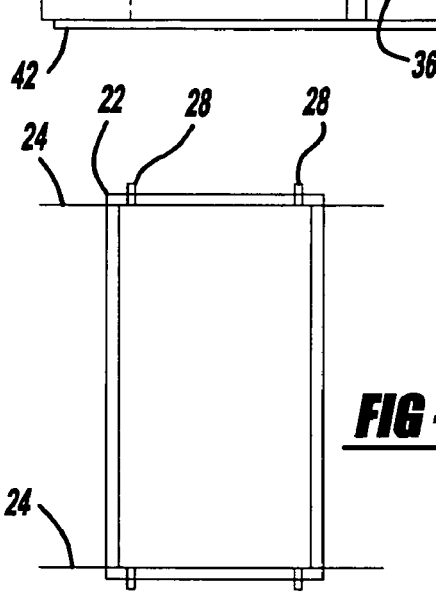
FIG. 4 is an elevation view of the security pocket door showing the areas of overlap of the pocket door with the surrounding bulkhead.
Figure 5:
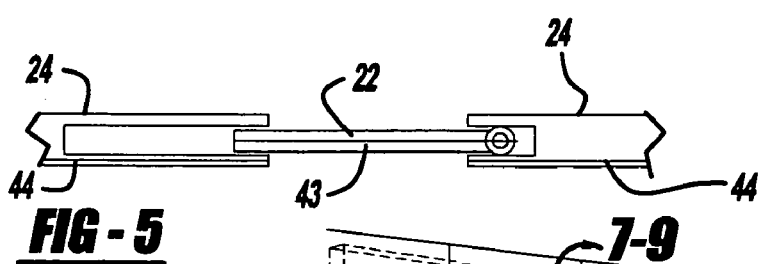
FIG. 5 is a top view of the security pocket door system depicting the overlap of the pocket door with the surrounding bulkhead.

Turning to FIGS. 4 and 5, a feature of the security pocket door 20 is shown. That feature is an overlap portion of the security door 20 between the bulkhead 24 and the perimeter of the security door 22. Although the overlap dimension can be whatever dimension is desired, for purposes of this embodiment, the overlap of the door within the bulkhead 24 is approximately one inch (25.4 mm). In this fashion, light can not be seen between the interface of the bulkhead 24 and the security door 22 and the ballistic armor 43 integral to the security pocket door overlaps the ballistic armor 44 in the security bulkhead.

Figure 6:
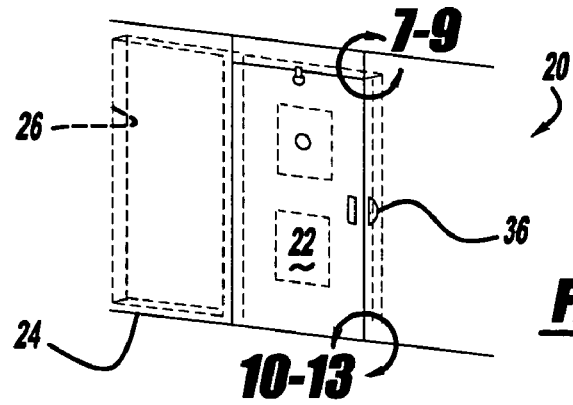
FIG. 6 is a perspective view of the security pocket door system depicting areas of rolling, guiding or tracking mechanisms.

FIG. 6 denotes the locations of the top and bottom rolling mechanisms that enable the security door 22 to traverse within the bulkhead 24. Examples of top rolling mechanisms employable on the security pocket door 20 are depicted in FIGS. 7-9. It should be noted that FIGS. 7-9 depict potential rolling mechanisms of the security pocket door 20, they are in no way the only top rolling mechanisms employable with the security pocket door 20. In fact, a variety of sliding mechanisms exist as potential methods of permitting the security door 22 to traverse within the bulkhead 24.

FIG. 7 depicts a first top rolling mechanism 50. The first top rolling mechanism 50 employs a top door hanger 52, to which a top door wheel 54 is attached. The top door wheel 54 is notched in a V-shape and has a first door wheel bevel 56 and a second door wheel bevel 58. The top door wheel 54 rides on a top track rail 33, that is, the top door wheel 54 bevels 56, 58 rides upon the bevels of the top track rail 33, which is part of the top track hanger 32. The top door hanger 52 is attached to the top surface of the security door 22.

Turning to FIG. 8, a second top track rolling mechanism 60 is depicted. This rolling mechanism employs a top C-channel 62 that encompasses or surrounds a top wheel 66 that rides within the interior portion of the top C-channel 62. The top wheel 66 is mounted on a vertical shaft 64 that is mounted to the top portion of the security door 22. While the top track rolling mechanism 50 of FIG. 7 depicts a rolling methodology in which the weight of the door may be entirely supported by the top track hanger 32, while the top track rolling mechanism 60 of FIG. 8 depicts a top rolling mechanism that merely guides the top wheel 66 and does not support any weight.

FIG. 9 depicts a third top rolling mechanism 70. This rolling mechanism employs a V-shaped top wheel 76 that rides against a top V-shaped track 72. A top wheel 76 is mounted on a horizontal shaft 74, the horizontal shaft 74 mounted within a groove cut into the top portion of the security door 22. The top wheel 76 has a dual bevel arrangement to form the recessed V-portion of the top wheel 76 that rides on the top V-shaped track 72. The top wheel 76 has a first door wheel bevel 56 and a second door wheel bevel 58.

As can be seen in FIGS. 7-9, the security door 22 overlaps or protrudes into the bulkhead 24 for added security. A major advantage between this security door 22 and a conventional door that swings open on hinges (not shown) is that the security pocket door 22 provides overlap. A conventional hinged door normally exposes its hinges or mechanism by which the door opens, on a side of the door. Additionally, a hinged door may also expose at least a bolt, on a side of the door opposite the hinges. However, with this security door 22, the rolling mechanisms depicted in FIGS. 7-9 are not visible to a person from either side of the security door 22. Additionally, the locking mechanisms of the security door 22 can not be seen by the door user and gaps around the door through which ballistic fragments can pass are eliminated.

FIGS. 10-13 depict mechanisms by which the security door 22 may traverse within a floor 25 or on a bottom door track of the aircraft 10. Turning to FIG. 10, the security door 22 is shown situated within the floor 25 or threshold (not shown) of the aircraft, the security door 22 being accommodated by three rollers 82, 84, 86. The first side roller 82 and the second side roller 84 maintain the lateral position of the security door 22 when it is rolling within the floor 25. A bottom roller 86 bears at least a portion of the weight of the security door 22, depending upon which top rolling mechanism is used, as the door traverses within the floor 25 of the aircraft. The rollers 82, 84, 86 may be mounted in or to the security door 22 or they may be mounted in the floor 25 that surrounds the bottom of the security door 22.

Turning to FIG. 11, a second bottom rolling mechanism 90 is depicted in which the security door 22 utilizes a bottom roller 92 situated on a horizontal shaft 94, the ends of which are mounted within a groove of the security door 22. In one variation of the embodiment, the bottom roller 92 rides upon an insert 96. The insert 96 may be made from any material that will facilitate a low rolling friction relationship between the bottom roller 92 and the insert 96. The bottom roller 92 rides upon an insert surface 98 of the insert 96.

Turning to FIG. 12, a third bottom rolling mechanism 100 is depicted. This rolling mechanism is similar to the second bottom rolling mechanism 90; however, the bottom roller 102 has a notched V-surface about its periphery. The periphery of the bottom roller 102 has a first bevel 108 and a second bevel 109 that form the V-shaped periphery. This V-shaped periphery rides upon a peak 107 of an insert 106. The bottom roller 102 utilizes a horizontal shaft 104 similar to the horizontal shaft 94 of the second bottom rolling mechanism 90. Similarly, the insert 106 serves a similar purpose as the insert 96 of the second bottom rolling mechanism 90. An advantage of the third bottom rolling mechanism 100 is that the V-shaped periphery of the bottom roller 102 with its first and second bevels 108, 109, ride upon the peak 107 of the nylon or other low rolling resistance material insert 106. With the bottom roller 102 riding upon the peak 107, the security door 22 is able to maintain its position within the floor 25, that is, the security door 22 is better able to maintain its position parallel to the floor 25, within the bottom track.

Turning to FIG. 13, a fourth bottom mechanism 110 is shown. This mechanism 110 employs a bottom blade 114 that fits within a bottom track 116. The bottom blade 114 is part of the overall bottom door slider 112 that provides ballistic protection for the bottom door gap and is made from stainless steel, titanium or a similar ballistic resistant material. As can be seen from FIG. 13, the portion of the bottom door slider 112 that is parallel to the top surface of the floor 25 is able to ride upon the top surface of the floor 25 if they should come into contact. Similarly, the bottom blade 114 that traverses within the bottom track 116 is permitted to bump against the walls of the bottom track 116. The bottom track surface 118 is permitted to come into contact with the bottom surface of the bottom blade 114; however, in an ideal situation, the bottom door slider 112 will not contact the floor 25 of the aircraft because the security door 22 hangs from the top track hanger 32. Since an ideal traversing relationship between the bottom door slider 112 and the bottom track 116 may not always be maintained, the bottom door slider 112 may be coated with a material that will facilitate sliding contact between the bottom door slider 112 and the bottom track 116. As an alternative, the bottom track 116 may be coated with a material that will facilitate sliding contact between the slider 112 and the bottom track 116. A further alternative would be for both the slider 112 and bottom track 116 to be coated with a low friction material. Materials that may be suited to the bottom door slider 112 and/or bottom track 116 are materials such as nylon, polytetrafluoroethylene (PTFE) or ultra-high molecular weight polyethylene (UHMWPE); however, the materials are not limited to such.

Figure 14:
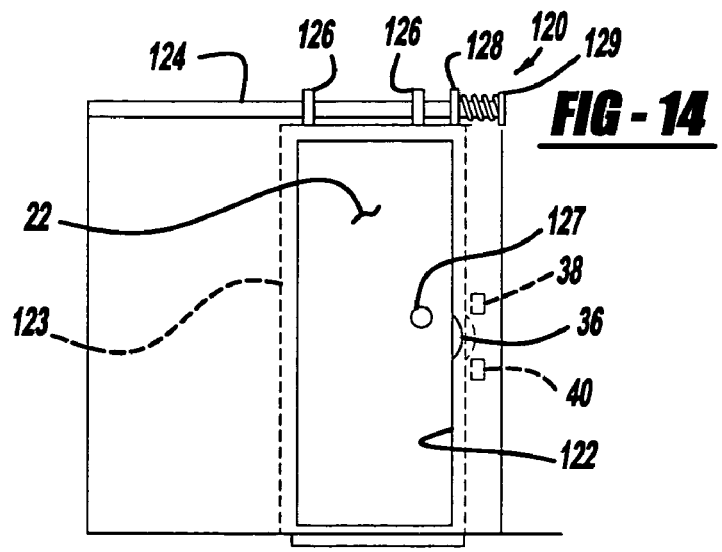
FIG. 14 is an elevation view of a security pocket door system utilizing a spring bumper on a rod above the pocket door.

With reference to FIG. 14, a security pocket door is depicted that employs a bumper mechanism 120. As can be seen from FIG. 14, the security door 22 has attached to its top, linear bearings 126 that ride upon a rod 124. When the security door 22 is moved toward its closed position, a bumper plate 128, attached to an end surface of a bumper spring 129, that is in turn attached to the bulkhead, contacts the security door. When the security door 22 contacts the bumper plate 128 and bumper spring 129, it is able to decelerate the security door 22 to bring the door to a halt. When the security door 22 is in its normally-closed position, the security door is in contact with the bumper plate 128 at the same time that the finger tab 36 aligns itself with the top solenoid 38 and bottom solenoid 40. In this manner, if the security door 22 is forced farther in the closed direction, the bumper plate 128 and the bumper spring 129 engagement will cause the spring to generate a restoring force and move the door back to its normally closed position and align the finger tab 36 with the solenoid pins. When the finger tab 36 becomes aligned between the top solenoid 38 and bottom solenoid 40, the top solenoid pin 138 and bottom solenoid pin 140 can engage holes or a cavity in the finger tab from opposite sides of the finger tab. At the time of this engagement of the solenoid pins 138, 140 with the finger tab 36, the door edge 123 will overlap with the bulkhead by approximately one inch. That is, the door edge 123 will lie one inch beyond the door opening 122 with respect to the bulkhead.

Figure 15:
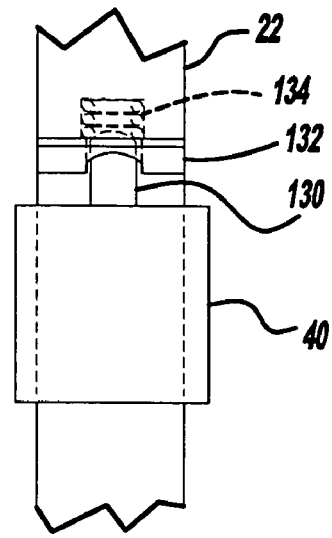
FIG. 15 is an edge view of a solenoid mechanism used to lock the pocket door within the bulkhead.

FIG. 15 shows an edge view of an alternate single solenoid arrangement in which the pin 130 of the solenoid 40 engages a pawl 132 instead of the finger tab 36. In this fashion, the solenoid 40 can be located in other areas of the bulkhead, adjacent the door not just at the location of the door tab 36 for example. With this arrangement, a user need only move the security door 22 by employing the door handle 127 to maneuver the door over the solenoid 40. The pin 130 and pawl 132 can be disengaged by a mechanical means or by de-energizing the solenoid 40.

Figure 16:
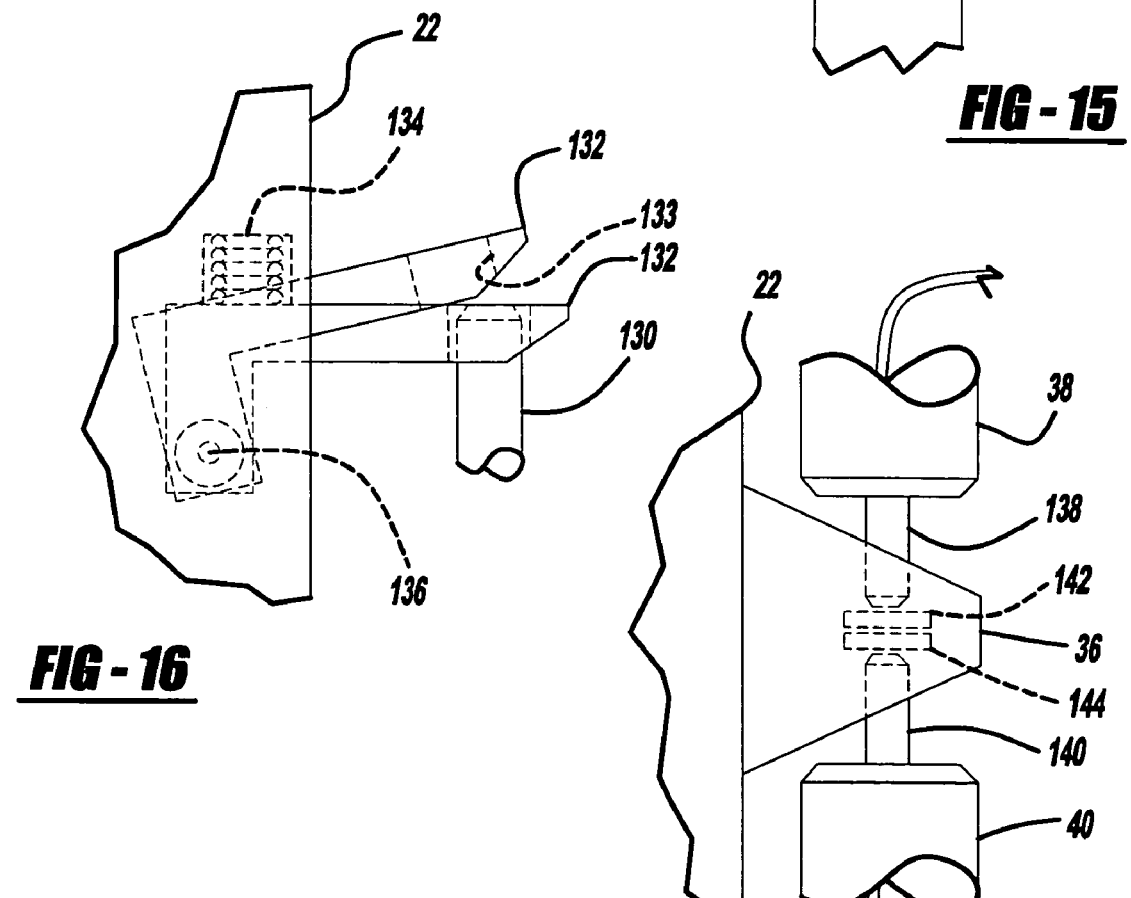
FIG. 16 is a side view of a biased locking lever and solenoid pin of the pocket door system.

FIG. 16 shows a side view of the single solenoid alternate locking mechanism located within the security door 22. The locking mechanism employs a pawl 132 and a pawl spring 134. Using this locking mechanism, the pawl 132 is normally in a horizontal position relative to the floor of the aircraft. When the door is moved to its closed position, the pawl 132 engages or comes in contact with a pin 130 of a solenoid. Upon the pawl 132 engaging the pin, because the pawl has a bevel cut onto its leading face, the pawl 132 is forced away from the pin 130 until the pin 130 aligns itself with a pawl hole 133 within the pawl 132. Upon this alignment of the pin 130 with the pawl hole 133, the pawl 132 is able to drop onto the pin 130 to lock the security door 22. The pawl 132 is biased by a pawl spring 134 into its horizontal position while the pawl 132 pivots about a pawl pivot pin 136. In order to unlock the security door 22, the pin 130 must be withdrawn from the pawl hole 133. This withdrawal of the pin 130 from the pawl hole 133 would normally be accomplished by a solenoid; however, other means such as manually sliding the pin 130 or using a motor (not shown) are possible. A lever-action to release the pin is also feasible.

Figure 17:
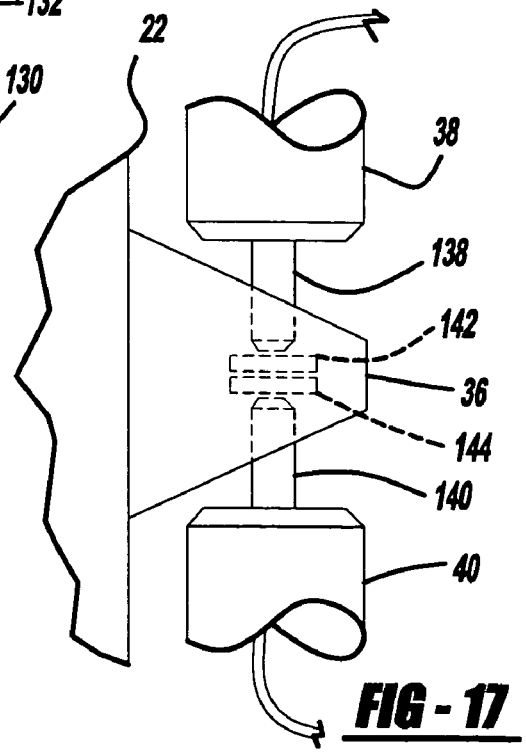
FIG. 17 is a side view of a dual solenoid locking mechanism and locking tab of the pocket door depicting indicator magnets within the door tab.

FIG. 17 depicts a dual solenoid arrangement in which the top solenoid 38 employs a top solenoid pin 138 and the bottom solenoid 40 employs a bottom solenoid pin 140, which both engage the finger tab 36. Within the finger tab 36 lies a top solenoid magnet 142 and a bottom solenoid magnet 144. These solenoid magnets 142, 144 are used to detect the presence of their respective solenoid pin in order to send an electric signal to the flight deck to notify the flight crew that the security door 22 is in its closed and locked position with the solenoid pins 138, 140 engaged. When the solenoid pins 138, 140 are not each proximate to their respective magnet, an electrical locking signal is not sent, or a different signal is sent to the flight deck to indicate an unlocked state of the pocket door 22.

FIG. 18 depicts a perspective view of a security door 22 showing its position outside of the bulkhead 24, in a normally-closed position. As can be seen, the security door 22 rides upon the rod 124 using linear bearings 126. The bumper plate 128 is shown attached to the bumper spring 129. An end plate 146 is located at the opposite end of the bumper spring 129 as the bumper plate 128. As can be seen in FIG. 18, the security door 22 is employed at a step down location on the aircraft floor. This location is typical of some large commercial aircraft where the flight deck is located at a lower or higher level than its adjoining compartment. That is, the security door 22 separates areas within the aircraft having different floor levels. It is also possible that the security door 22 can be used to separate compartments having the same floor level, including areas of an aircraft not involving a flight deck.

Additionally, the security pocket door system 20 may be used on non-passenger aircraft, such as cargo aircraft.

FIG. 19 depicts a security door 22 employed at a step down location of the aircraft floor. To situate the security door 22 at such a location, a threshold 150 is employed. The threshold 150 acts as a platform upon which the security door 22 rides. The security door 22 employs a bottom blade 114 along the bottom surface of the security door 22. The bottom blade 114 is situated within a track groove 156 that also acts as a cleanout slot 158. Because the bottom metallic blade 114 is coated with a material such as plastic, and the threshold 150 is made of a ballistic resistant metal material coated with a material such as plastic in the area of the track groove 156, the bottom blade 114 is easily able to slide upon the threshold 150 because of the low-friction coefficient between the two materials.

In the arrangement shown in FIG. 19, the security door 22 largely rides above the threshold 150. That is, the entire security door 22, except for the bottom blade 114, is situated above the threshold 150. The security door 22 is also located above the passenger cabin floor 162 and the flight deck floor 160. No tracks are located within the flight deck floor 160 or passenger cabin floor 162 in this arrangement. Low intensity lights 152 and black and yellow diagonally striped warning tape 148 are shown situated in a recessed area within the threshold 150 on the flight deck side of the threshold 150. In a similar fashion, low intensity lights 154 and black and yellow diagonally striped warning tape 147 are situated on the passenger side of the threshold 150. The lights 152, 154 and tape 147, 148, may be situated within a recession or located on top of the surface of the threshold 150. Flight deck carpet 163 may either abut the threshold 150 or be located under the threshold 150 on the flight deck side of the threshold 150. Likewise, passenger cabin carpet 164 may abut the threshold or be located under the threshold 150 on the passenger side of the threshold 150. Finally, from FIG. 19, the location of the bulkhead 24 can be seen over the step 159 and accompanying threshold 150. Finally, in this embodiment, a projectile 168 is shown with a potential projectile path 169 that might be encountered should such a projectile be directed toward the door's floor structure.

FIG. 20 depicts an arrangement of the security door 22 and its accompanying bulkhead 24 over a step 159. Like FIG. 19, the step 159 is a division point between the flight deck floor 160 and the passenger cabin floor 162. In this arrangement, the threshold 151 is designed differently than the threshold 150 of FIG. 19. The threshold 151 is designed such that the security door 22 fits within a recession or groove of the threshold 151. Again, the bulkhead 24 is situated over the step 159, while the security door 22 traverses within the bulkhead 24. This threshold 151 has a flared clean out slot 166. The clean out slots permit debris such as paperclips, lint and small particles of dirt, etc., to fall beyond the track groove 156 to a location under the threshold 151.

The security door is shown with a bottom blade 114 that rides within and makes contact with the threshold 151. Similar to the embodiment shown in FIG. 19, the embodiment shown in FIG. 20 depicts flight deck carpet 163 that either abuts the threshold 151 and/or is located under the threshold 151. Likewise, on the passenger cabin side of the security door 22, passenger cabin carpet 164 abuts against the threshold 151 and/or is located under the threshold 151. Low intensity lights 152 and warning tape 147 are located adjacent to the security door 22 on the flight deck side while low intensity lights 154 and warning tape 148 are located on a passenger side of the security door 22 adjacent to the security door 22. Finally, in this embodiment, a projectile 168 is shown with a potential projectile path 169 that might be encountered should such a projectile be directed toward the door's floor structure.

FIG. 21 depicts a security door finger tab 36, which is attached to the edge of the security door 22. The finger tab 36 is employed when a door operator uses his or her thumb 172 or a finger and places it into the groove or recession 170 of the finger tab 36 and applies force in the direction of arrow 174. The force supplied by a user's thumb 172 enables the door to move towards its final closed position. The grab handle 177 with a recessed portion 178 is used to complete the movement to the final closed position at which the finger tab 36 lies between the top solenoid 38 and bottom solenoid 40. When the finger tab 36 is in such a position, the top solenoid pin 138 and the bottom solenoid pin 140 are positioned to engage the finger tab 36.

FIG. 22 depicts the arrangement within the finger tab 36 showing the pawls 145, 146 which upon contact with the pins 138, 140 pivot as shown by arrows 135, 136. Springs 175, 176 return the pawls 145, 146 to their original positions once the pins 138, 140 align with the holes 187, 189 in the pawls thus locking the pins in place within the finger tab 36.

FIG. 23 depicts yet another embodiment of the security door 22. More specifically, FIG. 23 depicts a linkage opening mechanism 180. The linkage opening mechanism 180 utilizes a central linkage bar 182 and a door handle 127 to permit the unlocking of the security door 22. The unlocking is accomplished by the central linkage bar 182 being connected to the operative workings within the finger tab 36.

FIGS. 25 and 26 depict the operative workings of the mechanical linkage opening mechanism 180. FIG. 25 depicts an upper linkage bar 184p and a lower linkage bar 186p, each of which moves toward each other when the central linkage bar 182p has a force applied to it in the direction of arrow 183 (FIG. 25). FIG. 26 depicts the movement of the linkage bars of the linkage opening mechanism 180. More specifically, when a force is applied such as the force in the direction of arrow 183 of FIG. 25, the central linkage bar 182p moves to a new position depicted by position 182. Because of the movement of the central linkage bar 182p, the upper linkage bar 184p and the lower linkage bar 186p move from their pre-movement positions depicted by 184p and 186p, respectively, to their post-movement positions, 184 and 186. Central linkage bar 182p moves from its pre-movement position 182p to its post-movement position 182 as a result of its connection to and activation of door handle 127 such as by turning or sliding.

FIG. 27 is a perspective view of the security pocket door system depicting clean out panels 188, 190 in the bulkhead 24 to remove trash and dirt from within the bulkhead 24. In this embodiment, it can be seen that the security door 22 rides upon the rod 124 using linear bearings 126. Also, the security door 22 has an armored peep hole 34, deadbolt 41, a grab handle 177, a decompression panel 45 and an escape panel 46.

FIG. 28 is a cross-sectional view of the bottom of the security pocket door of FIG. 27. FIG. 28 shows how the security door 22 fits within a threshold 193 on an even surface with no step. The security door 22 essentially divides the threshold 193 into a flight deck side 192 of the threshold 193 and a passenger cabin side 198 of the threshold 193, with part of the threshold connecting the sides 192, 198 under the security door 22. This embodiment depicts contact pads 194, 196 that can be made of a low friction material to promote sliding of the door on such pads. The material is typically nylon or another plastic, such as UHMWPE, that will promote low friction contact between the security door 22 and such pads 194, 196. The carpet 195 typically abuts each side of the threshold or is embedded under each side 192, 198 of the threshold 193. Because part of the security door 22 lies below the surface of each side 192, 198 of the threshold 193, the security door 22 is able to provide overlap security protection in conjunction with the threshold 193. This design provides increased protection from an intruder or a projectile 199 compared to standard, hinged doors. It should be noted that FIG. 28 depicts a cross-sectional view taken at the edge of the door opening, that is, at the threshold 193 of the door.

Figure 29:
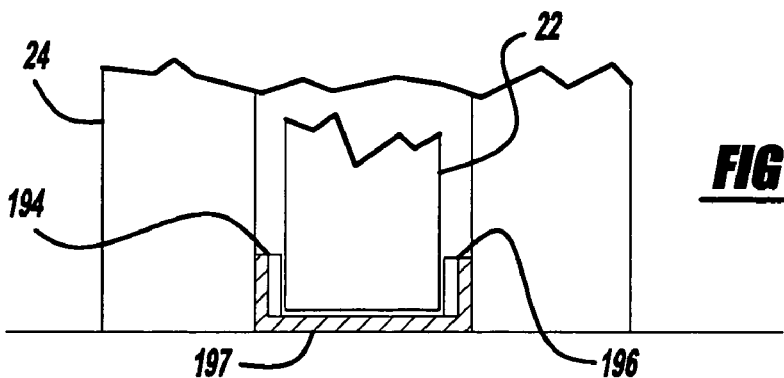
FIG. 29 is a view of the bottom of the security pocket door depicting guides and pads for the security door within the bulkhead.
Figure 30:
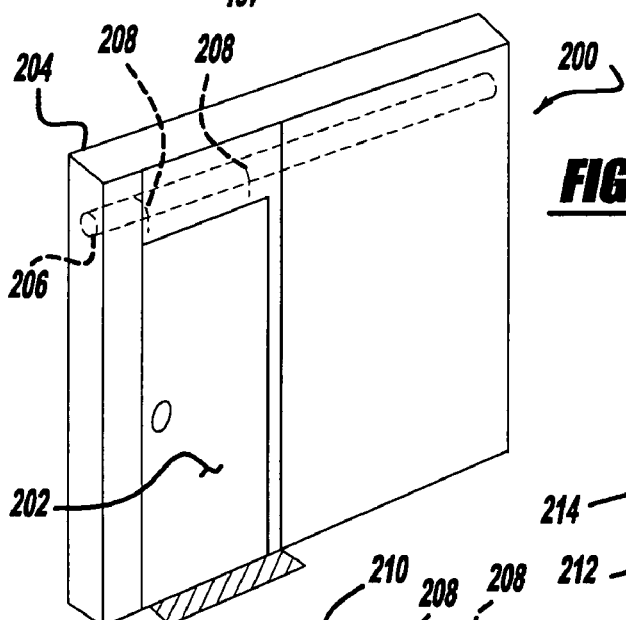
FIG. 30 is a perspective view of the security pocket door depicting a panel to permit removal of the security pocket door.

FIG. 29 is a cross-sectional view of the bottom of the security pocket door 22 that lies within bulkhead 24 and fits within the bottom track 197. The bottom track 197 is made from a metallic material and serves as a guide for the lower edge of the security door 22. This cross-sectional view is taken at an area away from the threshold 193 of the door. Similar to the threshold area, FIG. 29 depicts a flight deck side contact pad 194 and a passenger cabin side contact pad 196 within the bottom track 197. Again, these contact pads 194 and 196 are commonly made from a low friction plastic material such as nylon or UHMWPE.

Figure 31:
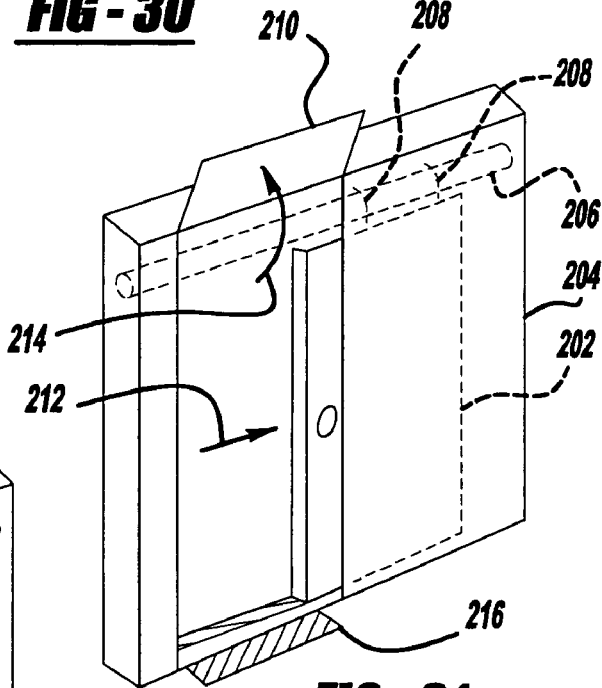
FIG. 31 is a perspective view of the security pocket door depicting a panel to permit removal of the security pocket door.
Figure 32:
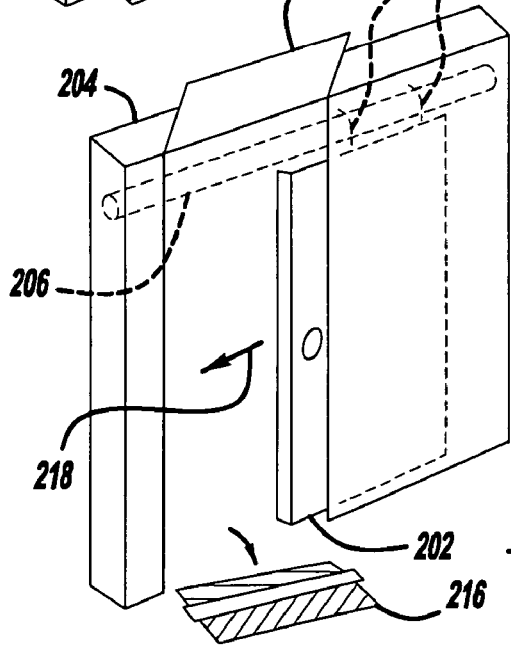
FIG. 32 is a perspective view of the security pocket door depicting a panel to permit removal of the security pocket door.

FIGS. 30-35 depict a removable security pocket door system 200. The system employs a security door 202 that traverses within a bulkhead 204 by using hinged linear bearings 208 that ride on a rod 206. From its installed position of FIG. 30, the removal of the security door 202 will be explained using FIGS. 31-35. FIG. 31 depicts the security door 202 being moved in the direction of arrow 212 on rod 206 by employing the hinged linear bearings 208. Upon or after moving the security door 202, the hinged or removable bulkhead panel 210 is manually or automatically lifted in order to provide access to the linear bearings 208 of the security door 202 to remove the security door 202 from its pocket. Typically, such a panel 210 is closed and locked in place using a lock that can only be accessed by airline maintenance personnel and is typically located on the flight deck side of the door. After raising the bulkhead panel 210, the threshold 216 is removed from its location within the doorway. Then, the security door 202 is moved in the direction of arrow 218, the security door 202 still riding on its hinged linear bearings 208.

Figure 33:
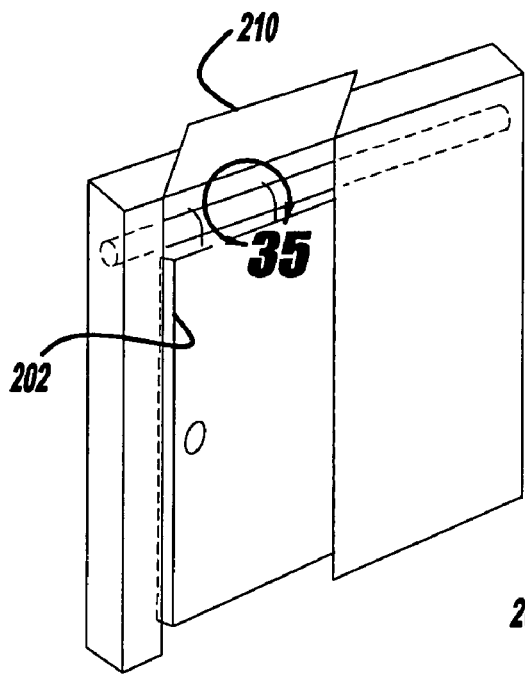
FIG. 33 is a perspective view of the security pocket door depicting the location of a hanging mechanism behind the door removal panel of the security pocket door.
Figure 34:
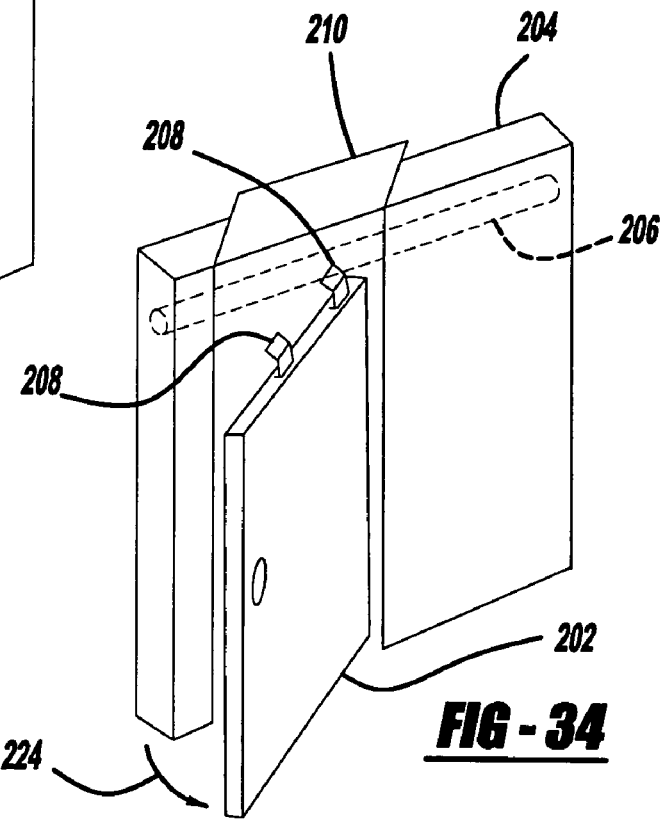
FIG. 34 is a perspective view of the security pocket door depicting the removal of the door using a hinged bearing device.
Figure 35:
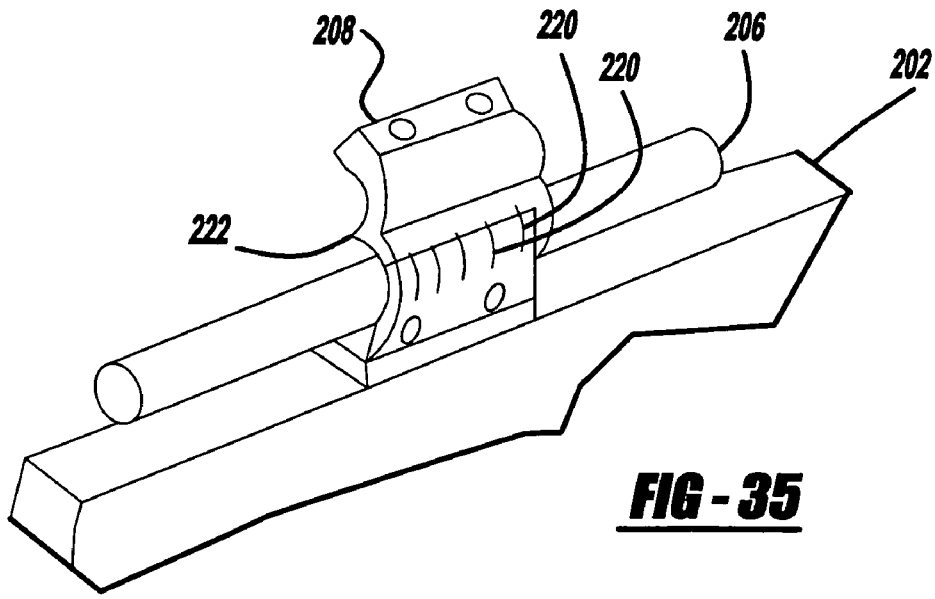
FIG. 35 is a perspective view of the security pocket door depicting an example of the hinged bearing device of FIG. 34.

FIG. 33 depicts the security door 202 in its door opening along with the bulkhead panel 210 in its upright and opened position. With the security door 202 in this position, the hinged linear bearings 208 are exposed to the person removing the security door 202. FIG. 34 depicts the security door 202 being moved from the rod 206 upon which the security door 202 rides. The security door 202 is swung in the direction of arrow 224 to complete its removal from the pocket within the bulkhead 204. FIG. 35 is an enlarged view of the hinged linear bearing 208 in its opened position. Upon opening or hinging the linear bearing 208 about its hinge axis 222, the individual bearings 220 are removable from their position against the rod 206 on which the bearings 220 ride.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A mobile platform interior pocket door system for positioning a pocket door adjacent an interface of first and second floor surfaces, wherein one of said surface is above the other, the pocket door system system comprising:

a bulkhead wall having ballistic and intrusion resistant properties, said wall defining a doorway for passage of people and having an upper wall track;

an interior bulkhead door having ballistic and intrusion resistant properties and defining an upper door track mechanism and a lower blade, said bulkhead wall having a first locking solenoid with a first engagement pin, wherein said upper door track mechanism engages said upper wall track;

a threshold component disposed at said interface of said first and second floor surface so as to form a transition therebetween, the threshold component being supported from both of said floor surfaces and including a track formed therein, said track adapted to slidingly support said lower blade of said interior bulkhead door; and a door tab attached to said bulkhead door, wherein said first engagement pin of said first locking solenoid is disposed generally perpendicular to said door tab and engages said door tab to lock said door when said door is moved linearly into its closed position.

2. The mobile platform pocket door system of claim 1, wherein when said door is in its closed position, the perimeter of said door overlaps the bulkhead wall on at least three sides of said door.

3. The mobile platform pocket door system of claim 1, wherein when said door is in its closed position, a bottom edge of said door resides above at least one of said first and second floor surfaces said floor.

4. The mobile platform pocket door system of claim 1, further comprising:

a second locking solenoid, said second locking solenoid employing a second locking pin that engages said door latch.

5. The mobile platform pocket door system of claim 4, wherein said door latch is engaged by said first pin from a top side of said door tab and said second pin engages said door tab from a bottom side of said door tab.

6. The mobile platform pocket door system of claim 4, wherein said first pin of said first solenoid and said second pin of said second solenoid are magnetic and each magnetically interact with at least one magnet within said door tab to indicate a door closed and locked condition.

7. The mobile platform pocket door system of claim 1, wherein said door tab is a pawl that pivots about a pawl pin in said door.

8. The mobile platform pocket door system of claim 1, wherein said pawl protrudes beyond an edge of said door.

9. The mobile platform pocket door system of claim 1, wherein said upper wall track has a removable track section within said doorway to facilitate installation and removal of said bulkhead door.

10. The mobile platform pocket door system of claim 9, said upper door track mechanism further comprising:

at least one hanger portion; and a wheel attached to each said hanger portion, wherein said wheel rolls within said upper wall track.

11. The mobile platform pocket door system of claim 9, said upper door track mechanism further comprising:

a roller adapted to a vertical axis, said roller riding within said upper wall track.

12. The mobile platform pocket door system of claim 1, wherein said upper wall track is C-shaped, within which said bulkhead door traverses.

13. The mobile platform pocket door system of claim 1, said lower door track mechanism further comprising:
   a roller with a horizontal axis, said roller riding within said floor track, where in said floor track is recessed into said floor.

14. The mobile platform pocket door system of claim 1, wherein said lower blade is bordered on three sides by said floor track.

15. A aircraft pocket door system for positioning a pocket door adjacent an interface of first and second floor surfaces, the pocket door system comprising:
   an internal pocket door having a tab projecting from one edge thereof and a lower blade;
   a wall defining a pocket, wherein said pocket door traverses within said pocket and said wall defines an opening to permit passage when said door is not covering said opening;
   an upper wall track mounted within said wall, a top of said door traversing via said upper wall track and a bottom of said door traversing via a floor track, wherein a portion of said wall is hinged to permit installation and removal of said pocket door within said wall;
   a bi-level threshold component disposed at said interface of said first and second floor surfaces, wherein one of said first and second floor surfaces is above the other, and one of said surfaces forms a flight deck surface and the other one of said first and second floor surfaces forms a passenger cabin floor surface, said threshold component forming a transition between said first and second floor surfaces, the threshold component being supported from both of said surfaces and including a floor track recessed therein, said floor track adapted to slidingly support said lower blade of said pocket door, and said threshold component further having a curving portion adapted to engage one of said surfaces in a manner to prevent contaminants from collecting adjacent to said floor track; and
   a solenoid having a pin positioned in said pocket so as to extend perpendicularly into engagement with said tab when said pocket door is moved linearly into a locked position.

16. The aircraft pocket door system of claim 15, further comprising:
   a door bumper mechanism to regulate the closed position of said pocket door relative to said wall opening.

17. The aircraft pocket door system of claim 16, wherein the door bumper mechanism further comprises:
   a door plate and a wall plate; and
   a spring, wherein said spring is mounted adjacent to said door plate and said wall plate and disposed between said door plate and said wall plate.

18. The aircraft pocket door system of claim 15, wherein said threshold contains a clean-out slot adjacent said floor track.

19. The aircraft pocket door system of claim 15, wherein said bi-level threshold's lowest level is lower than said floor track.

20. The aircraft pocket door system of claim 15, wherein said pocket door further comprises:
   a door knob; and
   mechanical linkage connecting said door knob and said door tab.

21. The aircraft pocket door system of claim 15, wherein said mechanical linkage is a scissor-acting, three-bar linkage mechanism.

22. The aircraft pocket door system of claim 21, wherein two bars of the three-bar linkage mechanism interact with pins of a locking mechanism.

23. The aircraft pocket door system of claim 15, wherein said upper wall track further comprises:
   a rod, wherein a hinged linear bearing of said pocket door traverses on said rod to permit said pocket door to traverse within said pocket.

24. The pocket door system of claim 15, wherein said bi-level threshold includes a recess offset from said floor track in which is mounted a low intensity light.

25. The pocket door system of claim 15, wherein said bi-level threshold includes a recess offset from said floor track within which is disposed a warning tape.

26. The pocket door system of claim 15, wherein opposite edge portions of said bi-level threshold are adapted to hold edge portions of carpeting of said flight deck and said passenger cabin thereunder.

* * * * *